United States Patent [19]

Thorud

[11] 4,326,370
[45] Apr. 27, 1982

[54] ROTARY LAWN MOWER

[75] Inventor: Richard A. Thorud, Bloomington, Minn.

[73] Assignee: The Toro Company, Minneapolis, Minn.

[21] Appl. No.: 188,293

[22] Filed: Sep. 18, 1980

Related U.S. Application Data

[62] Division of Ser. No. 44,168, May 31, 1979, abandoned.

[51] Int. Cl.³ ............................................. A01D 35/26
[52] U.S. Cl. ...................................... 56/202; 56/17.5; 56/255; 56/320.1; 56/320.2
[58] Field of Search ..................... 56/202, 320.2, 16.6, 56/255, 320.1, 17.5

[56] References Cited

U.S. PATENT DOCUMENTS

| | | | |
|---|---|---|---|
| 3,020,693 | 2/1962 | Sears | 56/320.2 |
| 3,413,783 | 12/1968 | Gordon | 56/320.2 |
| 3,636,686 | 1/1972 | Meyer et al. | 56/320.2 |
| 3,646,739 | 3/1972 | Dahl | 56/320.2 |
| 3,696,595 | 10/1972 | Dahl | 56/320.2 |
| 3,919,832 | 11/1975 | Christopherson | 56/202 |
| 4,149,363 | 4/1979 | Woelffer et al. | 56/202 |

FOREIGN PATENT DOCUMENTS 1246587  9/1971  United Kingdom ............... 56/320.2

Primary Examiner—Jay N. Eskovitz
Attorney, Agent, or Firm—James W. Miller

[57] ABSTRACT

A rotary lawn mower 2 includes a housing 4 having a side discharge port 54 located downstream of a rear discharge port 52. A downwardly opening tunnel 32 is tilted from front to back to define a grass circulating passageway. Discharge ports 52 and 54 may be blocked so that tunnel 32 operates as an improved mulcher with the grass clippings being discharged therefrom in a substantially downward direction. Lawn mower 2 includes a grass receiving means 12 having a chute 140 which may be releasably coupled on rear deck 21 of housing 4. Chute 140 has an open mouth with an area which is much larger than the cross-sectional area of the chute to more easily empty a bag 126 attached to the chute. In addition, dispersal attachment 180 can be alternatively coupled to rear deck 21 for dispersing the cut grass clippings in a pattern behind housing 4.

10 Claims, 14 Drawing Figures

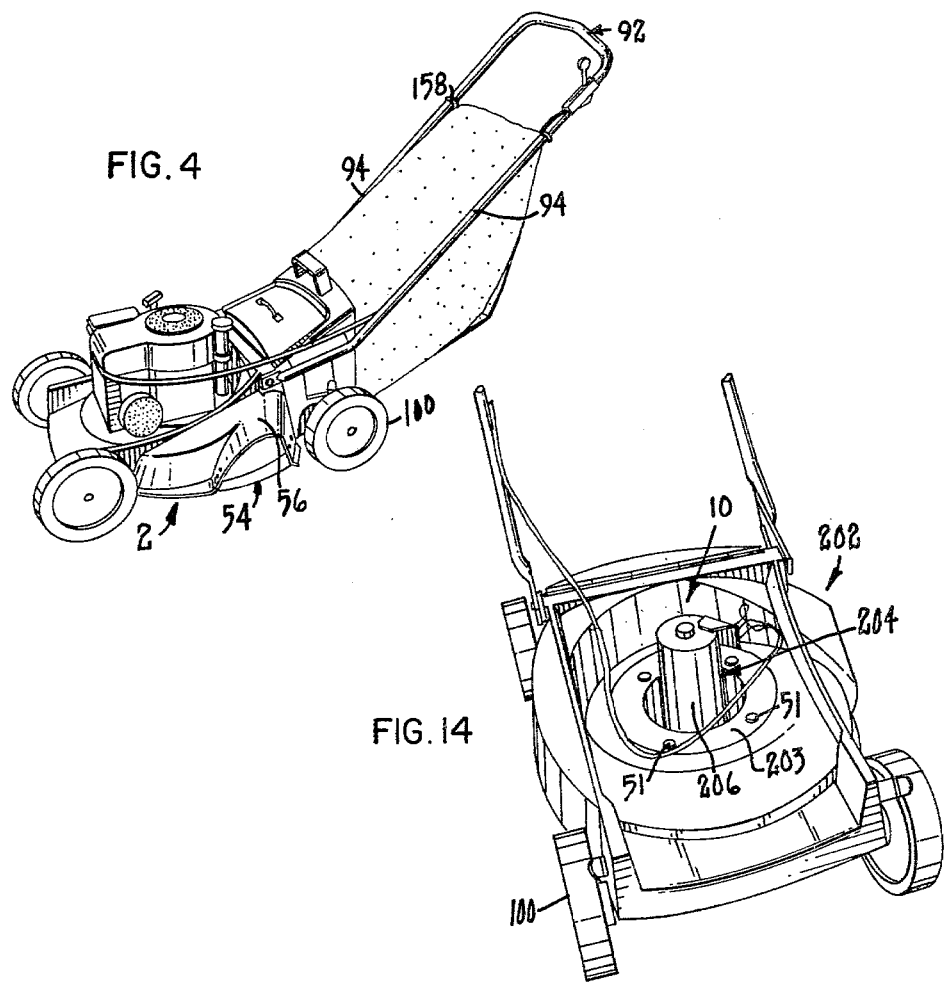
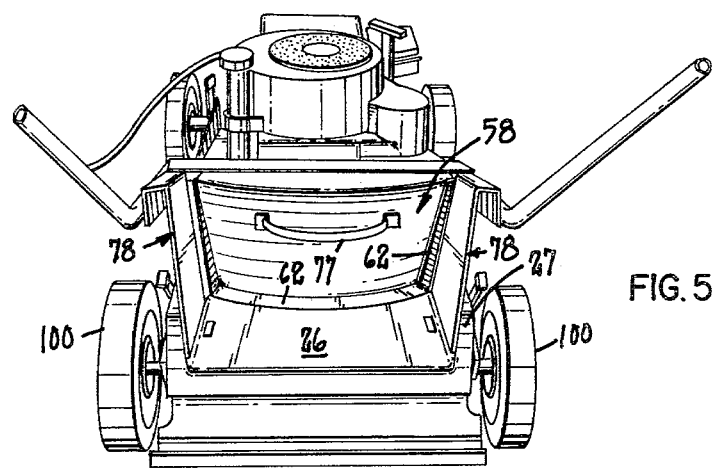

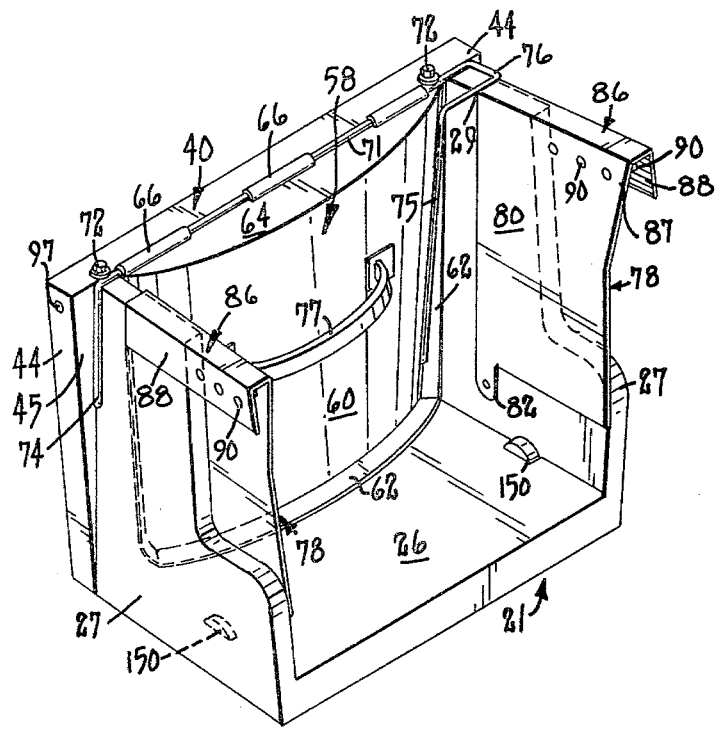
FIG. 7
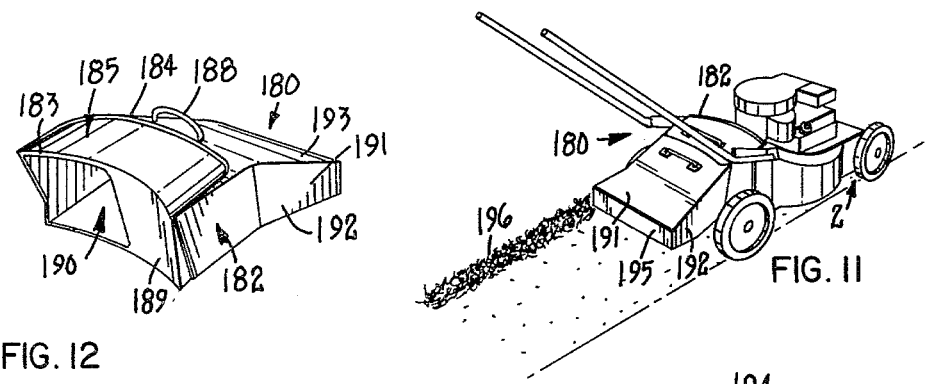
FIG. 12
FIG. 11
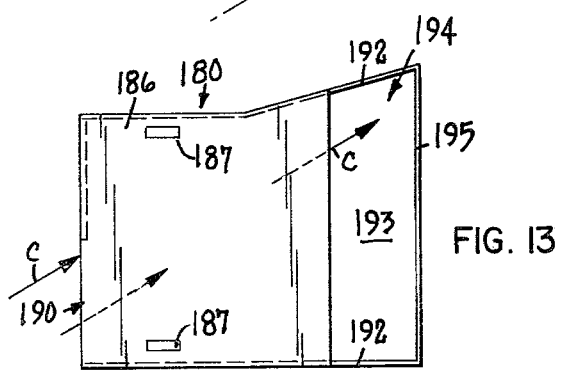
FIG. 13

ROTARY LAWN MOWER

This is a division of application Ser. No. 44,168, filed May 31, 1979, now abandoned.

TECHNICAL FIELD

This invention relates in general to machines for mowing grass or similar vegetation which is used generally as lawn cover. More particularly, this invention relates to a rotary type of lawn mower in which a cutting element is rotated in a horizontal cutting plane for severing grass at a predetermined height above the ground. As such, this invention is applicable to lawn mowers regardless of the type of power source used to drive the cutting element and/or the type of cutting element which is used.

BACKGROUND OF THE PRIOR ART

Motorized lawn mowers are well-known for cutting grass or similar vegetation. These lawn mowers generally include a housing, a rotatable cutting element which is rotated in a cutting chamber inside the housing, and some type of motive means or power source for effecting rotation of the cutting element. The housings of such mowers have typically been designed to incorporate one or more grass discharge ports. The particles of cut grass are discharged through these discharge ports by the operation of the cutting element, i.e. the air flow pattern induced by rotation of the cutting element is effective to propel the grass particles outwardly through the discharge ports. Conventionally, many lawn mowers of this type have included a side discharge port which is located on the right side of the mower housing (taken from the perspective of one who is standing to the rear of the housing). Such a discharge chute usually sends the grass out a number of feet to the operator's right hand side during a grass mowing operation.

A desirable feature for rotary lawn mowers is the capability of bagging the cut grass particles. Older types of rotary lawn mowers used a flexible bag which was placed around a portion of the side discharge chute. The neck of the bag had a drawstring which could be tightened and cinched to releasably affix the bag on the side discharge port. In this type of mower, one could alternatively use either the side discharge port or the bagging attachment, but these elements were not simultaneously usable.

As the state of the art progressed, it was found to be desirable to have the bagging attachment location at the very rear of the machine. This enabled a more compact design since the bag no longer extended out to one side of the mower housing, but rather extended directly behind the housing into the space occupied by the mower handle. In turn, this enabled the mower to be used in more tightly confined spaces and to cut closer to an obstructing surface along the right side of the housing. This feature has, to the best of Applicant's knowledge, been provided simply by placing an appropriate rear bagging structure downstream of the typical side discharge port which is found on the right side of most mower housings. One example of such a rear bagging mower is the 21" Rear Bagger Mower which have been manufactured and marketed by The Toro Company of Minneapolis, Minn., which is the assignee of the present application.

While lawn mowers such as the 21" Rear Bagger are effective in cutting the grass and incorporate a number of desirable features, the fact that the side discharge port is located upstream of the rear bagging attachment presents a number of disadvantages. For one thing, grass will always be discharged through the side discharge port and will never reach the rear bagging attachment unless the side discharge port is affirmatively blocked. Thus, to convert the mower into a bagging mode of operation, it is necessary to install a suitable side cover over the side discharge port. This involves an extra step or operation for the operator and to this extent represents a disadvantage.

In addition, the grass receiving bags which have been heretofore used are effective but somewhat disadvantageous for the following reasons. The older type of bag having a flexible body with a drawstring at the neck is often difficult to empty when the bag is filled because the mouth of the bag is relatively small and the drawstring must first be loosened to allow the mouth to expand to the greatest possible extent. Other types of bags are known which use a flexible bag portion and a relatively rigid chute or mouth fixedly attached to the open end of the bag. This chute can be latched in place against a discharge port on the mower body. However, the rigid chute portions of the prior art bags usually have relatively small entrance openings. These openings are usually closed by a door or flap on the front of the chute which retains the clippings in the bag during bag removal from the housing. This bag door must be opened in order to dump the clippings from the bag. Because of the need for this door to retain the clippings, the prior art bags have been somewhat complex and more expensive to manufacture.

In addition to lawn mowers, mowing machines have been devised which are used for mulching purposes. In a mulcher, the particles of cut grass are desirably recirculated a number of times to cut the particles as finely as possible. These particles are then desirably driven downwardly to hide or embed the particles of cut grass in the uncut lawn. This prevents the unsightly appearance of grass clippings left on top of the lawn. In addition, the mulcher enables the grass clippings to decompose on the lawn in the manner of compost or fertilizer for the lawn. In many instances, mulchers, because of their design, have been manufactured and sold separately from lawn mowers. Insofar as this represents a duplication of investment by the consumer, it is somewhat wasteful. It would instead be preferable that the same machine be able to effectively perform both as a mulcher and as a lawn mower.

The Toro 21" Rear Bagger noted above has been designed to operate both as a lawn mower and as a mulcher. To place this machine into a mulching mode, both the side discharge port and the rear discharge port associated with the rear bagging means are closed by using the side cover and by closing a rear door on the rear discharge port. In this configuration, the Toro Rear Bagger has an enclosed cutting chamber in which the particles of cut grass will be continuously circulated until they eventually are discharged downwardly onto the grass. However, since this machine has been designed with a relatively flat deck, particles of cut grass are sometimes not driven downwardly with sufficient force to effect a complete hiding of these particles in the uncut lawn. This is disadvantageous.

Various other mulchers utilize separate means for effecting a sufficient downward movement of the cut grass particles. One machine of which Applicant is aware utilizes a cutting blade having a cross-sectional shape with a number of corrugations therein. These corrugations ostensibly act to drive the cut grass particles downwardly into the grass. In addition, the assignee of this invention, in a co-pending U.S. patent application, Ser. No. 931,267, filed on Aug. 4, 1978, discloses a mulcher which basically utilizes a flat deck or housing. However, the underside of the housing in the cutting chamber utilizes a plurality of kickers or baffles for engaging the cut grass particles that are propelled through the cutting chamber. These kickers deflect the particles downwardly into the grass. While both of these machines effectively act as mulchers, they have a disadvantage in that some means, in addition to the basic housing configuration, must be used to effect the necessary downward movement of the cut grass particles.

BRIEF SUMMARY OF THE INVENTION

This invention relates to a rotary lawn mower which obviates the above-noted disadvantages of prior art mowers.

The rotary lawn mower of this invention includes a housing having means for movably supporting the housing above the ground. The housing carries cutting means in the form of a rotatable cutting element for cutting grass at a predetermined height above the ground. The cutting means projects the particles of cut grass in a preferred path of travel relative to the housing.

One aspect of this invention is a grass circulating passageway adjacent to the cutting element into which the cut grass particles are flung. The grass circulating passageway is continuous from an entry point at which the cut grass particles enter the passageway to an exit point at which the cut grass particles are discharged from the passageway. The passageway is downwardly inclined adjacent the exit point at a sufficient angle relative to the horizontal cutting plane of the cutting element so that the discharged cut grass particles are substantially hidden in the uncut grass. In this regard then, the invention operates as an improved mulcher.

In addition, the rotary lawn mower of this invention includes side and rear discharge ports located in the housing along the path of travel of the cut grass particles. Means may be connected to the rear discharge port for receiving and collecting the cut grass particles therein. The side discharge port is located downstream of the rear discharge port in the direction of rotation of the cutting element such that the cut grass particles normally enter the rear discharge port before reaching the side discharge port. Thus, the receiving means may be used to bag the discharged particles without first blocking the side discharge port and the side discharge port will act as means for visually indicating a filled condition of the receiving means.

Furthermore, the lawn mower of this invention includes an improved expandable bag or receiving means for collecting the cut grass particles. The receiving means includes an elongated flexible bag and a relatively rigid chute. The chute has one or more circumferential walls with at least one wall having a cutaway portion. The cutaway portion of this wall communicates with an entrance opening of the chute and forms an additional open area through which the cut grass particles can be discharged during emptying of the chute. Such a bag is releasably contained on the mower housing adjacent the rear discharge port. The housing includes means for closing the cutaway portion in the wall of the chute when the receiving means is coupled to the discharge port so that the cut grass particles are directed through the chute and into the receiving means.

Moreover, the lawn mower of this invention also relates to a dispersal attachment for dispersing the cut grass particles over an area in back of the mower housing. The dispersal attachment includes a front hollow chute portion which is shaped to be telescopically received in a portion of the housing of the mower adjacent the discharge port. The dispersal attachment also includes a rear dispersing member connected to the front chute portion. This dispersing member includes a downwardly extending cavity into which the cut grass particles are projected. The cavity includes a rear wall which extends downwardly into the path of movement of the grass particles for intercepting those particles and causing them to be driven downwardly into the uncut grass. Preferably, the chute portion of the dispersal member is identical in its exterior shape to the chute of the receiving means to allow either the receiving means or the dispersal member to be alternatively coupled on the housing adjacent the rear discharge port.

Another aspect of this invention relates to a mower housing which includes a seat adjacent the discharge port in which the receiving means for the grass particles is received. This seat has upwardly extending side wings which extend along and outwardly from each side of the discharge port. These side wings are sufficiently sized to intercept objects which may be accidentally thrown through the discharge port when the receiving means is not connected thereto. Pivotal door means is located on the housing for normally closing the discharge port when the receiving means is not connected thereto.

Finally, yet another aspect of this invention relates to an improved method for making mower bodies having a side discharge port. That method includes utilizing a set of molds in which a portion of the mold for making the side discharge port is removable. That mold portion is removed whenever it is desired to make mower bodies not having a side discharge port.

BRIEF DESCRIPTION OF THE DRAWINGS

This invention will be described hereafter in the following Detailed Description, when taken in conjunction with the following drawings, in which like reference numerals will refer to like elements throughout.

FIG. 4 is a perspective view showing the lawn mower of FIG. 1 from the left side of the mower;

FIG. 5 is a rear perspective view of the lawn mower shown in FIG. 1, particularly illustrating the seat which receives the grass receiving means for the mower;

FIG. 7 is a partial perspective view of the rear discharge port of the lawn mower shown in FIG. 1, particularly illustrating the pivotal door for closing the rear discharge port, the spring biasing means for that door, and the seating area on the housing for telescopically receiving a portion of the grass receiving means;

FIG. 11 is a perspective view of the lawn mower shown in FIG. 1, particularly illustrating the dispersal attachment for use with the rear discharge port for dispersing the cut grass particles in an area behind the mower housing;

FIG. 12 is a perspective view of the dispersal attachment of FIG. 11, particularly illustrating the entrance opening to the dispersal attachment;

FIG. 13 is a bottom plan view of the dispersal attachment shown in FIG. 11; and

FIG. 14 is a partial perspective view of a second embodiment of a rotary lawn mower according to this invention.

DETAILED DESCRIPTION

Figure 1:
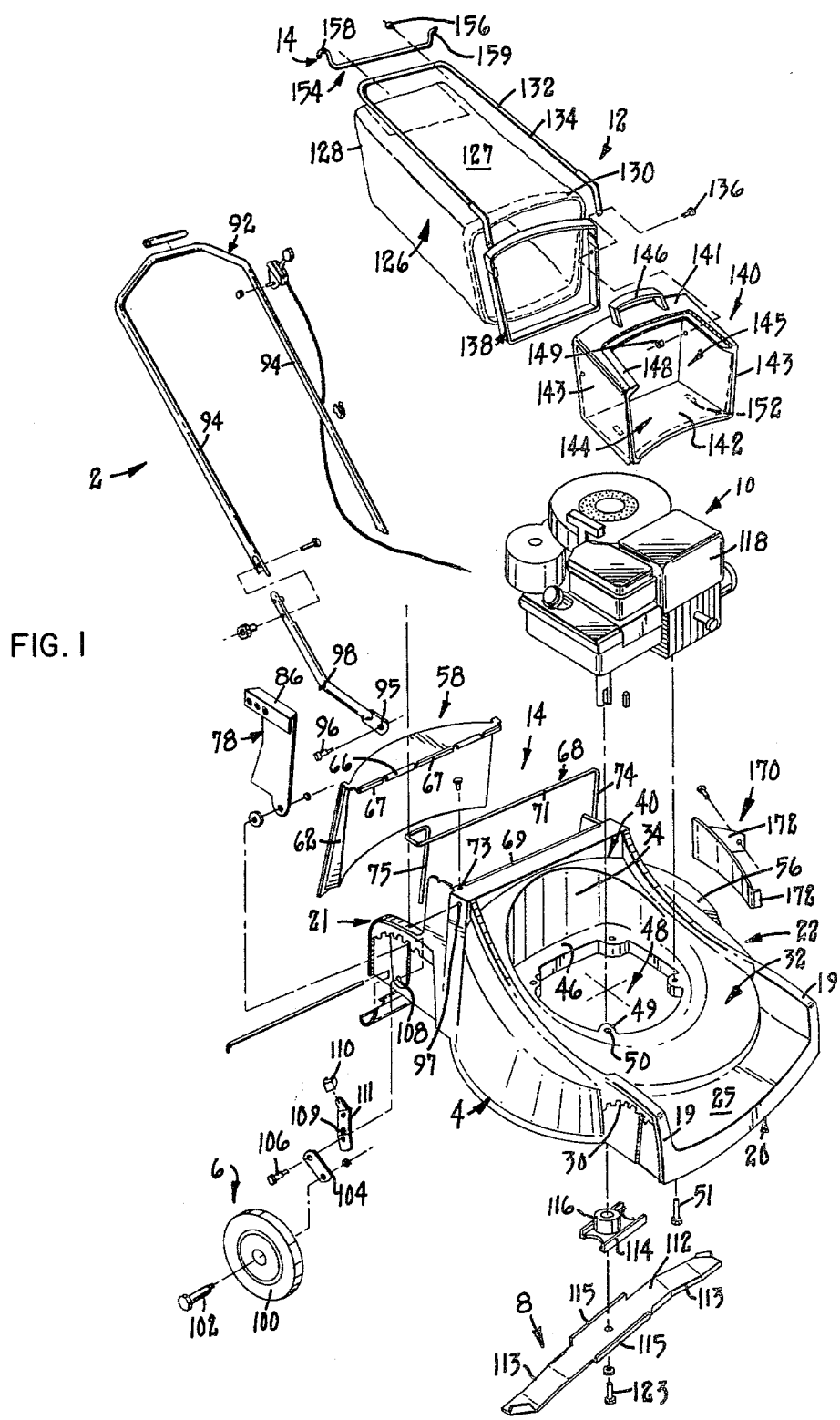
FIG. 1 is an exploded assembly view of a first embodiment of an improved rotary lawn mower of this invention.

Referring first to FIG. 1, an improved rotary lawn mower according to this invention is generally illustrated as 2. Lawn mower 2 comprises a number of interrelated components. Each of the components of lawn mower 2 will be described in detail hereafter. However, by way of introduction, lawn mower 2 comprises a housing 4, support means 6 for movably supporting housing 4 above the ground, cutting means 8 for severing or cutting grass at a predetermined height above the ground, motive means 10 for powering cutting means 8, receiving means 12 for receiving and collecting the grass clippings or the particles of cut grass which have been severed by cutting means 8, and coupling means 14 for releasably securing receiving means 12 to housing 4.

Rotary lawn mower 2 is primarily intended for cutting grass or any other vegetation suitable for use as ground cover. However, the type of vegetation being cut by lawn mower 2 is not important to the present invention as long as it can in fact be properly cut by cutting means 8. Thus, the term grass as used herein is not meant to limit the present invention. In addition to cutting the grass, lawn mower 2 is able to discharge the grass clippings in various directions relative to housing 4 or bag those clippings in receiving means 12. Moreover, lawn mower 2 can also be operated as a mulching mower. By mulching it is meant that a majority of the grass clippings or cut grass particles are driven downwardly with sufficient force such that these particles are substantially hidden beneath the level of the uncut grass. These clippings are then acted upon by the moisture and the naturally occurring bacteria present on the ground and decompose to serve as nutrient for the lawn.

The Housing

Figure 2:
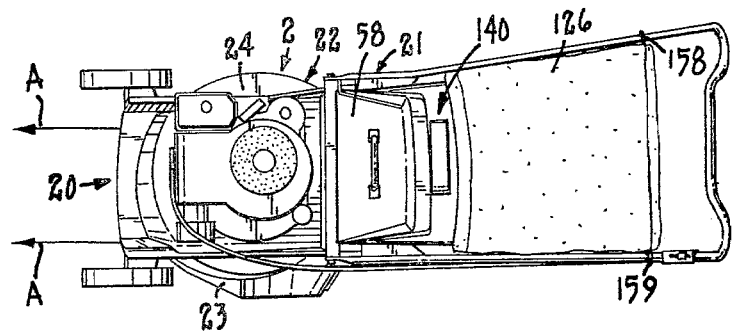
FIG. 2 is a top elevational view of the lawn mower shown in FIG. 1.
Figure 3:
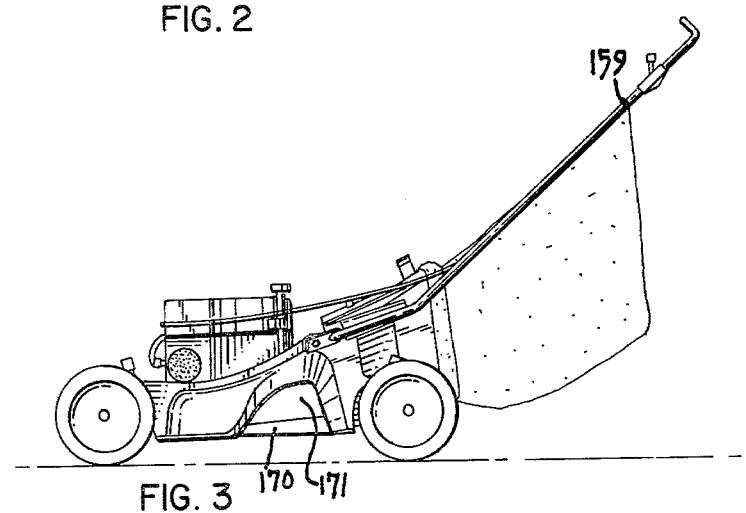
FIG. 3 is a left side elevational view of the lawn mower shown in FIG. 1.
Figure 8:
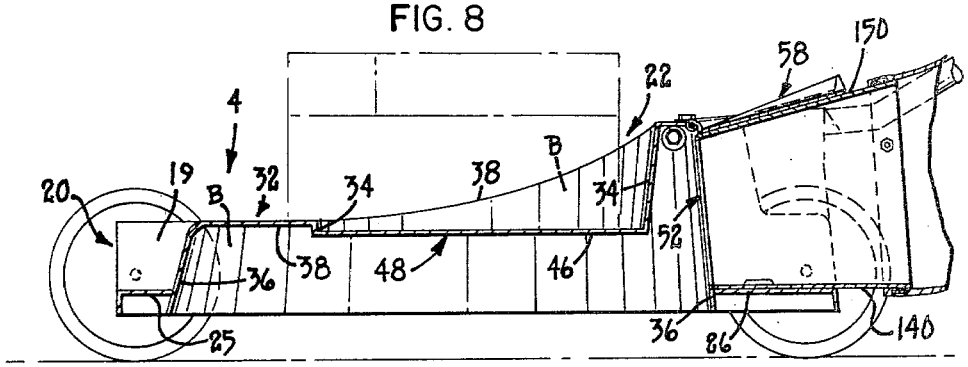
FIG. 8 is a longitudinal cross-sectional view taken through the mower housing of the lawn mower shown in FIG. 1.
Figure 9:
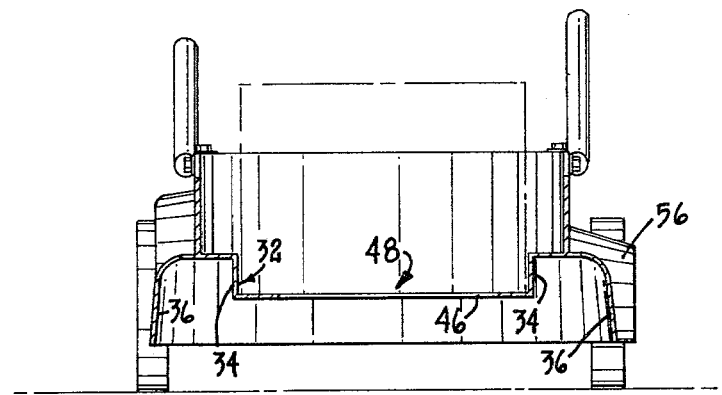
FIG. 9 is a transverse cross-sectional view taken through the mower housing of the lawn mower shown in FIG. 1.

Referring to FIGS. 1, 8 and 9, housing 2 includes a front deck 20, a rear deck 21, and a substantially circular central deck 22, having opposed sides 23 and 24, connecting the front and rear decks 20 and 21. Taken from the perspective of an operator who is standing behind rear deck 21 and facing housing 4, front deck 20 defines the front side of housing 4, rear deck 21 defines the rear side of housing 4, and the opposed sides 23 and 24 of central deck 22 define, respectively, the left and right sides of housing 4. (See FIG. 2). The front and rear sides of housing 4 extend generally perpendicularly to and the left and right sides extend generally along or parallel with the direction in which housing 4 is normally moved over the ground. This direction is indicated by the arrows A in FIG. 2. Preferably, housing 4 is integrally molded or cast with decks 20-22 being simultaneously and integrally formed. Any suitable materials may be used in constructing housing 4, e.g. a strong, light-weight metal or fiberglass material.

Both the front and rear decks 20 and 21 have a similar upwardly facing U-shaped configuration. For example, front deck 20 includes a substantially horizontal surface 25 and two upwardly extending vertical side walls 19 at each side of surface 25. (See FIG. 1). Similarly, rear deck 21 includes a substantially horizontal support surface 26 bounded at either side by two vertical L-shaped side walls 27. (See FIG. 7). Each of the side walls 27 terminate in an upper edge 28. The upper edge 28 of one of the side walls 27 includes two spaced and transverse grooves or notches 29 at the front thereof. Side walls 26 and 27 of both the front and rear decks 20 and 21 are provided on an exterior face with a row of angularly arranged teeth 30. Teeth 30 coact with a portion of support means 6 in a manner known in the art to adjustably position housing 4 above the ground.

Figure 10:
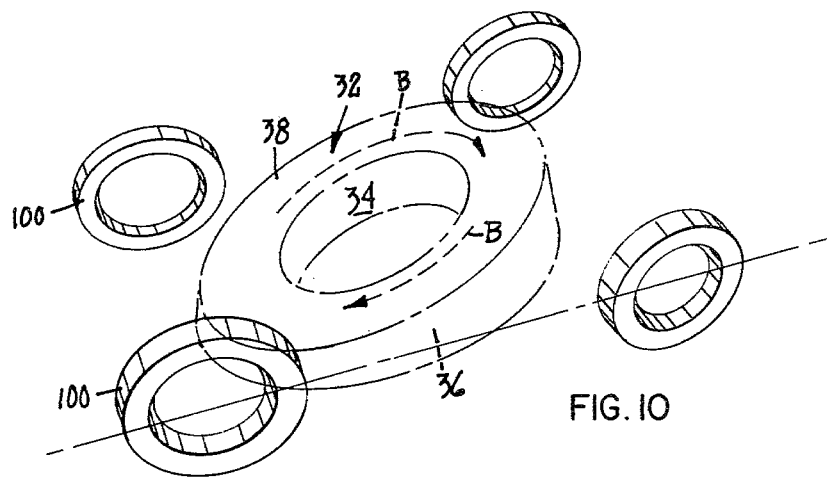
FIG. 10 is a diagrammatic view illustrating the titled orientation of the grass cirulating passageway in the mower housing of the lawn mower shown in FIG. 1 which allows use of the mower as a mulcher.

Central deck 22 includes an annular and downwardly opening tunnel 32. Tunnel 32 includes circular and concentric inner and outer walls 34 and 36 integrally joined together by a top wall 38. Top wall 38 of tunnel 32 is slanted or tilted upwardly from front deck 20 to rear deck 21. In effect, tunnel 32 comprises an inclined grass circulating path formed on the undersurface of housing 4. As will be described in more detail hereafter, cutting means 8 will cause grass clippings to be driven against top wall 38 as they are circulated in a clockwise direction through tunnel 32. Thus, assuming the clippings enter tunnel 32 adjacent front deck 20, these clippings will first be elevated as the travel through the first half, i.e. the ascending portion, of tunnel 32, and will then be driven downwardly as they travel through the second half, i.e. the descending portion, of tunnel 32. Note the arrows B in FIGS. 8 and 10 which represent the pattern of grass circulation in tunnel 32. The "tilted donut" configuration of tunnel 32 is important when lawn mower 2 is operated in a mulching mode.

Tunnel 32 includes a U-shaped saddle 40 adjacent the rear deck 21. Saddle 40 forms the junction between the rear deck 21 and central deck 22. Saddle 40 includes a horizontal top wall 42 having a vertical side rib 44 integrally formed on each end thereof. Preferably, side ribs 44 at the top thereof extend outwardly past the side walls 27 of rear deck 21 and gradually taper inwardly as one proceeds downwardly along the ribs 44. Thus, ribs 44 form rearwardly facing shoulders or bearing surfaces 45 adjacent the front edges of side walls 27. The top wall 42 of saddle 40 lies in the plane of the top edges 28 of side walls 27. (See FIG. 7).

In addition to tunnel 32, central deck 22 contains a substantially horizontal mounting flange or support surface 46 which fills the circular area inside the inner wall 34 of tunnel 32. Support surface 46 is located slightly below the level of top wall 38 at the lowest point of top wall 38 adjacent the front side of housing 4.

Support surface 46 includes an aperture 48 which is sized to accept the casing of the largest motive means 10 designed for use on housing 4. Aperture 48 includes a plurality of inwardly extending mounting lugs 49 each of which includes a circular hole 50. A threaded securing member 51, such as a tap bolt, extends upwardly through each of the holes 50. Securing members 51 are threadedly received in the casing of motive means 8 to releasably couple motive means 8 to support surface 46. Because support surface 46 is horizontal while tunnel 32 is tilted, the inner wall 34 of tunnel 32 may be seen progressively rising above support surface 46 from front to back on housing 4, as shown generally in FIGS. 1 and 8.

The outer wall 36 of tunnel 32 includes circumferentially spaced first and second grass discharge openings or ports denoted respectively as 52 and 54. First discharge port 52 is located in outer wall 36 immediately adjacent rear deck 21 and may consequently be referred to as a rear discharge port. Rear discharge port 52 is substantially rectangular although the port is effectively curved relative to housing 4 since outer wall 36 is curved. Rear discharge port 52 has a width which is substantially equal to the width of support surface 26 of rear deck 21 and a height generally equal to the height of the front edges of side walls 27 of rear deck 21. Rear discharge port 52 thus occupies an area generally equal to the largest cross-sectional area bounded by support surface 26 and side walls 27. Second discharge port 54 is located in the left side of housing 4. A small truncated chute 56 surrounds and defines discharge port 54. Discharge port 54 may be referred to as a side discharge port since chute 56 will direct cut grass particles generally to the left side of housing 4 in a manner known in the art.

Housing 4 further includes means for normally closing or blocking the rear discharge port 52. This closing means includes a pivotal rear access member or door 58 mounted on housing 4 adjacent rear discharge port 52. Door 58 includes a flap 60 which is curved to match the curvature in outer wall 36 and is sized to cover or block rear discharge port 52. The bottom and side edges of flap 60 include lips 62 which extend outwardly at an angle relative to these edges. Lips 62 engage and seal against the support surface 26 and side walls 27 of rear deck 21 when door 58 is in a closed position. (See FIG. 7) Door 58 also includes a substantially horizontal top wall 64 which extends to the front from the top edge of flap 60. Oppositely opening semi-circular hinge members 66 and 67 are alternately arranged along the inner edge of top wall 64. Hinge members 66 face downwardly and hinge members 67 face upwardly to define, in conjunction with a hinge spring 68, the means for pivotably mounting door 58 on housing 4. Hinge members 66 and 67 are received for rotation in an arcuate recess 69 located in the top wall 42 of saddle 40.

Referring to FIGS. 1 and 7, hinge spring 68 includes a straight pivot rod portion 71 which may be inserted into hinge members 66 and 67 on door 58. Threaded securing members 72, such as tap bolts, are threadedly received in circular holes 73 adjacent each side of top wall 42. Securing members 72 clamp against the pivot rod portion 71 of hinge spring 68 to fix hinge spring 68 relative to housing 4. Hinge spring 68 also includes a first downwardly extending portion 74 at one end and a second downwardly extending portion 75 at the other end. Downwardly extending portion 75 is longitudinally offset from the pivot rod portion 71 by means of a U-shaped offset 76. Offset 76 is received in the grooves 29 in the top edge 28 of one of side walls 27.

Referring to FIG. 7, when hinge spring 68 is installed on housing 4 by securing members 72, pivot rod portion 71 extends through the hinge members 66 and 67 on door 58 to pivotably journal door 58 on housing 4. The first downwardly extending portion 74 is located outside of one of the side walls 27 and engages against the rearwardly facing bearing surface 45 formed by rib 44. By virtue of the offset 76, the second downwardly extending portion 75 is located to bear against the outer face of flap 60 of the door 58. Preferably, the portion 75 bears against flap 60 at the junction with one of the lips 62 so that this portion does not tend to slide off the flap 60. Door 58 includes a handle 77 located on the outer face of flap 60. Handle 77 may be grabbed to manually rotate the door 58 around hinge spring 68.

While hinge spring 68 rotatably journals door 58 on housing 4, it also serves as a means for biasing the door 58 into a normally closed position in which rear discharge port 52 is blocked. In this regard, the biasing action of hinge spring 68 results from the fact that hinge spring 68 is fixed against rotation by securing members 72 and is pre-stressed or twisted around the axis of pivot rod portion 71 before hinge spring 68 is connected by securing members 72 to housing 4. This twisting imposes a torque in the hinge spring 68 which attempts to relieve itself. However, this torque cannot be relieved by movement of the first downwardly extending portion 74 since that portion engages against bearing surface 45. The only other way in which the torque can be relieved is by rotation of the second downwardly extending portion 75 which bears against flap 60. This is the source of the biasing force which tends to keep the door 58 in a normally closed position. In addition, when door 58 is open, the second downwardly extending portion 75 is rotated relative to the pivot rod portion 71 to further increase the torque imposed thereon. Thus, the biasing force on the door 58 increases as the door is moved from a closed to an open position. The biasing force exerted by the spring 68 on door 58 is important for reasons to be noted hereafter.

Housing 4 further includes two side extensions or side wings 78 on rear deck 21 which extend outwardly from each side of rear discharge port 52 along side walls 27. Side wings 78 comprise vertical plate members 80 having a mounting lug 82 at the lower end thereof. A threaded securing member, e.g. a tap bolt, passes through lug 82 to releasably couple the vertical plate member 80 of the side wing to the inside surface of one side wall 27. The upper end of plate member 80 includes a U-shaped bracket 86 which is sized to be received on the upper edge 28 of side wall 27. Bracket 86 includes inner and outer walls 87 and 88 having a row of circular holes or openings 90 therein. Plate members 80 of side wings 78 are sufficiently large to block any object which is accidentally thrown through the rear discharge port 52 after momentarily opening door 58.

Housing 4 also includes means for guiding the housing during movement over the ground. The guiding means comprises a substantially U-shaped handle 92 formed from two transversely spaced and upwardly extending rods 94. Rods 94 may be formed by joining together a number of extensions end-to-end or may each be a single piece if so desired. The lower end of each rod 94 has an aperture 95 for receiving a threaded securing member 96. Securing member 96 is releasably received in a threaded aperture 97 on the outside of rib 44.

Securing members 96 pivotably mount handle 92 relative to housing 4 so that the angle of the handle 92 with regard to housing 4 may be adjusted to suit the operator's preference.

Means is also provided for locking the handle 92 in one of a plurality of positions relative to housing 4. In this regard, each of the rods 94 includes an outwardly extending pin 98. Pin 98 is positioned on the rod 94 at a position adjacent the point at which the rods 94 pass upwardly past the outer wall 88 of each side wing 78. Side wings 78 are received inside the rods 94. Each of the pins 98 may be received in one set of aligned openings 90 in the rows thereof located on the U-shaped bracket 86 on the side wings 78 for locking the handle 94 relative to housing 4. To adjust the angle of handle 92 relative to housing 4, the pin 98 may be disengaged from one set of openings 90 by flexing side wings 78 until the openings 90 clear the pin 98. The handle may then be rotated to an adjusted position with the pin 98 being inserted into a different set of openings 90. Thus, lawn mower 2 includes means for quickly and easily adjusting the angle of handle 92 relative to housing 4.

The Support Means

Support means 6 for movably supporting housing 4 above the ground includes four rotatable wheels 100 located at each corner of housing 4. Only one rear wheel 100 is shown in FIG. 1, but the other wheels 100 and the structure used to connect wheels 100 to housing 4 are identical. Wheel 100 is mounted by a wheel bolt 102 to the lower end of a pivot arm 104. The upper end of the pivot arm 104 has a pivot screw 106 extending therethrough (the screw 106 for the rear wheels are also used to mount side wings 78). Screw 106 is releasably received in an aperture 108 on one of the exterior surfaces of one of the side walls 26 or 27. A spring arm 109 is interposed on screw 106 between the pivot arm 104 and the side wall 26 or 27. The upper end of spring arm 109 includes a knob 110 and a locking portion 111 which is adapted to be engaged with one of the teeth 30 formed on the side walls.

The arrangement noted above for supporting wheel 100 is of the type that has been conventionally used by the assignee of this invention for similar types of lawn mowers. In effect, wheels 100 are eccentrically mounted relative to housing 4. The spring arm 109 can be pulled outwardly until the locking portion 111 disengages the teeth 30. Then, spring arm 109, and thus the pivot arm 104, can be rotated to change the position of the wheels 100 relative to the ground by a distance which is dependent on the amount of rotation of pivot arm 109. When the height of housing 4 has been adjusted in this manner, spring arm 109 can be released so that the locking portion 111 reengages teeth 30 to lock the wheel 100 in an adjusted vertical position.

While it is preferred that the support means 6 comprises adjustable wheels 100 as disclosed herein, any suitable means for movably supporting housing 4 could be used. For example, the support means 6 could comprise an air cushion or the like generated by operation of a suitable fan or rotor. This air cushion could be directed downwardly towards the ground to movably float or support the housing 4 thereabove. In addition, either the front wheel or the rear wheels on housing 4 could be driven from motive means 10 in any conventional manner so that housing 4 is self-propelled. Thus, the particular type of support means 6 which is utilized is not critical to the present invention.

The Cutting Means

Figure 6:
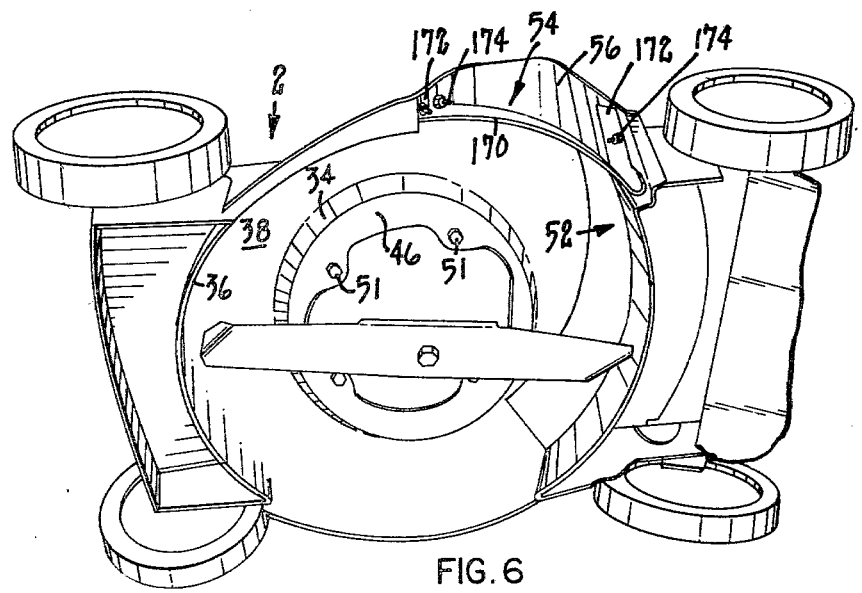
FIG. 6 is a bottom perspective view of a lawn mower shown in FIG. 1, particularly illustrating the undersurface of the housing of the mower and the grass circulating passageway formed therein.

The cutting means 8 for cutting the grass preferably includes a relatively rigid and rotatable cutting element. As shown in FIG. 1, this cutting element preferably comprises a substantially rigid blade 112 having a number of cutting edges 113. A blade retainer 114 is coupled to the center of the top surface of blade 112 by two opposed retaining flanges 115. Blade retainer 114 includes an upwardly directed apertured hub 116 having a keyway. This keyway releasably couples blade 112 to a portion of the motive means 10, i.e. a drive shaft. As shown in FIG. 6, cutting blade 112 during use is positioned generally beneath the underside of housing 4, i.e. directly beneath the grass circulating path defined by tunnel 32.

Cutting blade 112 is rotatable about a substantially vertical axis and in a horizontal cutting plane. Blade 112 is configured, i.e. by blade tip configuration and speed of rotation, to generate an air flow relative to housing 4. This air flow will pick up and entrain the particles of cut grass to carry them in a preferred path of travel relative to housing 4. Since the blade 112 rotates in a clockwise direction, this path of travel will be the clockwise pattern of grass circulation in tunnel 32 illustrated by arrows B. Thus, the cut grass particles enter tunnel 32 at an entry point relatively close to front deck 20 and circulate in a clockwise direction therethrough. If these particles are not discharged by the rear discharge port 52 or the side discharge port 54, then they will exit the tunnel 32 at an exit point also relatively close to front deck 20, but after having completed slightly less than 360° of travel.

Although a relatively rigid cutting blade 112 is preferred for cutting means 8, any suitable cutting element could be used. For example, a flexible line contained on a spool could be used as the cutting element. This line could be extended from the motive means outwardly to rotate in a circle beneath housing 4 to sever or cut the grass. The use of such line as cutting elements is well known in monofilament line trimmers and the like. If such line is used as the cutting element in mower 2, an additional desirable feature is some type of means for feeding out additional line when it is necessary to replenish the line because of a break or fracture therein.

The Motive Means

Preferably, motive means 10 comprises a three horse power (3 h.p.) Briggs & Stratton internal combustion engine 118. Engine 118 includes a downwardly extending drive shaft 120. Drive shaft 120 extends through aperture 48 in the support surface 46 in central deck 22. A key 122 is received in the keyway to nonrotatably join the lower end of drive shaft 120 to blade retainer 114. A special screw or bolt 123 extends up through hub 116 and is threadedly received in the lower end of drive shaft 120. Screw 123 prevents blade 112 and blade retainer 114 from falling off the lower end of drive shaft 120. If screw 123 is removed, blade 112 may also be removed to sharpen cutting edges 113. Engine 118 could have any suitable horsepower or configuration.

Other types of power sources could be used for motive means 10. Referring now to FIG. 14, a second embodiment of a lawn mower 202 is illustrated in which a different motive means 10 is utilized to drive rotatable blade 112. In this embodiment, the motive means 10 comprises an electric motor 204 having a generally cylindrical body 206. Since body 206 of motor 204 is much smaller than the internal combustion engine 118, a motor mount 208 is used to releasably mount motor 204 in aperture 48. Motor mount 208 is simply releasably attached in cavity 48 by the threaded securing members 51 which extend through holes 50. Motor mount 208 simply decreases the size of cavity 48 to a value which is appropriate to the size of motor 204. Lawn mower 202 will be provided with an electrical supply cord attached to the mower housing. This cord may be coupled to an AC electrical power source for powering motor 204.

A plurality of motor mounts 208 can be provided if different types or sizes of power sources are meant to be releasably coupled to housing 4 of lawn mower 202. For example, a 110 V Bosch "C-pack" motor or a 220 V Stahlschmidt motor could be used as electric motor 204. With different power sources, slightly different motor mounts 208 might be provided. However, the same mower housing 4 can be molded and used even with such differently sized power sources since aperture 48 is dimensioned to receive the largest power source used, i.e. engine 118. The smaller sized power sources can then be used simply by inserting differently sized motor mounts 208 in aperture 48. Thus, a plurality of different mower bodies or housings need not be provided for different power sources. This decreases the cost of manufacturing lawn mowers 2.

The Grass Receiving Means

The grass receiving means 12 includes a hollow container of finite capacity which preferably comprises a flexible and generally rectangular bag 126. Bag 126 is made from a relatively soft and pliable material, such as a fabric or the like, to allow bag 126 to be expandable. Bag 126 has a closed upper end 128 and an open lower end 130. A rigid U-shaped bag frame 132 is sewn or otherwise secured to the top wall 127 of bag 126 to give some rigidity to the bag. Bag frame 132 includes two spaced longitudinally extending rods 134. The lower ends of rods 134 are pivotably coupled by a screw 136 to a bag chute frame 138. Bag chute frame 138 is generally rectangular and is fixedly secured to the open end 130 of bag 126, as by sewing frame 138 into bag 126. Preferably, both the bag frame 132 and the bag chute frame 138 are sewn inside bag 126 in pockets provided therein. However, frames 132 and 138 could be secured to the exterior of bag 126 if so desired. While a flexible bag 126 is preferred, a rigid plastic container of generally similar shape could be used in place thereof.

Grass receiving means 12 also includes a hollow and relatively rigid bag chute 140. Chute 140 is generally rectangular having top and bottom walls 141 and 142 and side walls 143 which terminate in a front entrance opening 144 to bag 126. A portion of top wall 141 is cut away to define an additional open area 145 which adjoins the entrance opening 144 of chute 140. Together, this open area 145 is top wall 141 and entrance opening 144 of chute 140 define an open mouth for the chute having a total area which is larger than the cross-sectional area of the chute itself.

An upwardly extending handle 146 is located on the top wall 141 of chute 140 adjacent the cut-away portion thereof. A recessed U-shaped lip 148 surrounds the open area 145 defined by the cut-away portion of top wall 141. Lip 148 forms a bearing surface for a purpose to be described hereafter. Preferably, the bag chute 140 is fixedly mounted inside bag chute frame 138 by means of the screw 136. A nut 149 is received on the end of screw 136. However, since the bag frame 132 is freely and pivotably received on the shank of screw 136, the angular orientation between chute 140 and bag 126 can be easily changed for a purpose to be described hereafter.

The Coupling Means for the Grass Receiving Means

The coupling means for releasably securing grass receiving means 12 to housing 4 includes, in part, the bag chute 140 and the rear deck 21 of housing 4. The configuration of the support surface 26 and side walls 27 of rear deck 21 defines a U-shaped upwardly opening seat on the housing 4 in which chute 140 can be telescopically received. In this regard, pivotal door 58 is first opened and the chute 140 is received on rear deck 21 with the bottom and the side walls 142 and 143 of chute 140 being engaged against the horizontal support surface 26 and side walls 27 respectively. The entrance opening 144 of chute 140 is shaped to mate in a face-to-face relationship with the rear discharge port 52. In addition, the open area 145 defined by the cutaway portion in top wall 144 of chute 140 will be closed by the pivotal door 58 when chute 140 is received in the seat defined by rear deck 21. (See FIGS. 4 and 8.) Pivotal door 58 will have the outer lips 62 thereof bearing against the lip 148 on chute 140 to lock chute 140 in place on the seat defined by rear deck 21. In addition, because door 58 is biased when open toward support surface 26, the biasing force developed by door 58 forces chute 140 downwardly firmly into engagement therewith. If this biasing force from door 58 is sufficiently strong, this may be all the locking force which is needed to couple chute 140 to rear deck 21.

In order to increase the locking action between chute 140 and the seat area of rear deck 21 (in case the biasing force of door 58 is not sufficiently strong), an additional detent means is also preferably used. This detent means includes two semi-circular lugs 150 formed on the horizontal surface 26 of rear deck 21 adjacent each of the side walls 27. Two correspondingly shaped recesses 152 are molded into the underside of bottom wall 42 of chute 140. Recesses 152 are shaped to receive the lugs 150 therein to further retain chute 140 in place on rear deck 21, especially under the biasing influence of door 58. While chute 140 and the seat defined by rear deck 21 have been disclosed as having a generally rectangular cross-sectional configuration, any other cross-sectional configuration could be used as long as chute 140 is firmly and nonrotatably secured to housing 4.

The coupling means 14 further includes means for supporting the closed upper end 128 of bag 126 on housing 4. This support means includes a hanger member 154 which passes through the upper end 128 of bag 126. Hanger member 154 is affixed by a threaded securing member 156 to a portion of the U-shaped bag frame 132. Hanger member 154 has one outwardly extending U-shaped loop 158 at one end thereof and a second outwardly extending L-shaped support flange on loop 159 at the other end. These loops 158 and 159 extend outwardly from bag 126 and are located on either side thereof. Loops 158 and 159 are adapted to be received respectively on top of the rods 94 of handle 92. An L-shaped flange or loop 159 is preferred at one end of hanger member 154, rather than another downwardly facing U-shaped loop, since then the spacing between loops 158 and 159 is not critical in order for hanger member 154 to fit on rods 94. Thus, the coupling means 14 for grass receiving means 12 includes both the configuration of chute 140 and its inter-engagement with the seat defined by rear deck 21 along with the hanger member 154.

Use of the Lawn Mower

In using lawn mower 2, the wheels 100 rollably support housing 4 on the ground. The vertical position of wheels 10 may be suitably adjusted so that housing 4 is a desired distance above the ground. This controls the depth of the cut which cutting blade 112 will make when cutting the grass. The internal combustion engine 118 is filled with an appropriate fuel. When this engine 118 is operating, cutting blade 112 will be rotated in its horizontal cutting plane to sever the grass at a predetermined height above the ground.

Lawn Mower 2 can be operated in one of at least three modes:

(1) a rear bagging mode in which grass receiving means 12 is releasably coupled to rear deck 21 of housing 4;

(2) a side discharge mode in which grass receiving means 12 is removed from rear deck 21, rear discharge port 52 is closed, and the grass is discharged through the side discharge port 54; and (3) a mulching mode in which both discharge ports 52 and 54 are closed and the cut grass particles are circulated through the grass circulating passageway defined by tunnel 32 until they are finally discharged downwardly adjacent the front of tunnel 32.

As noted earlier, the cut grass particles travel in the clockwise direction of arrows B in tunnel 32. In this direction, the rear discharge port 52 is the first discharge opening encountered by the cut grass particles. These particles will be discharged through port 52 when it is open by virtue of the grass receiving means 12 being coupled thereto. However, if port 52 should be closed by the door 58, cut grass particles will continue onwardly in the direction of the arrows B until they come to the side discharge port 54. They will then be discharged outwardly to the left side of mower 2 onto the grass.

The provision of having the side discharge port 54 placed downstream of the rear discharge port 52 is advantageous for a number of reasons. First, this placement allows the grass receiving means 12 to be utilized without having to affirmatively block or seal off the side discharge port 54 as in prior art mowers. Thus, at least one step in the operation of the lawn mower has been done away with since the mere insertion of the grass receiving means 12 onto housing 4 automatically converts the mower into a rear bagging mode of operation. Secondly, when the bag 126 of grass receiving means 12 becomes filled with grass, no further cut grass particles can enter through the rear discharge port 54. These particles continue in the preferred path of travel illustrated by arrows B until they discharge through the side discharge port 54. Thus, an operator, who is mowing the grass with the grass receiving means 12 in place, will eventually notice cut grass particles being discharged through the side discharge port 54. This is a visual indication that the grass receiving means 12 is full and needs to be emptied.

To convert the lawn mower 2 into its mulching mode of operation, it is necessary to affirmatively block off the side discharge port 54. This is accomplished by removably installing therein a port cover or blocking member 171 in the space above a deflector bar 170. Referring to FIGS. 1 and 6, deflector bar 170 is curved and angularly oriented mounting flanges 172 are attached to each end thereof. Threaded securing members 174, such as bolts or the like, can pass through the chute 56 surrounding side discharge port 54 and through the mounting flanges 172 to releasably hold the deflector bar in place as shown in FIG. 6. The curved deflector bar 170 has a curvature which matches the curvature of the radially outer wall 36 of tunnel 32 so that deflector bar 170 forms a continuation of tunnel 32. Deflector bar 170, however, does not occupy the entire space of the side discharge port 54. Thus, blocking member 171 is shaped to block off the remaining space of the side discharge port 54 above the deflector bar 170 and may have any suitable shape or any suitable means for releasable means for releasably attaching the blocking member to mower housing 4.

When mower 2 is operated with both the rear discharge port 52 closed by door 58 and the side discharge port 54 blocked by blocking member 171, tunnel 32 is then substantially continuous and has no discharge openings therein other than the fact that the tunnel is open in a downward direction facing the ground. The cut grass particles will then be circulated from their entry point in tunnel 32 all the way around the tunnel 32 to an exit point located somewhere near front deck 20. However, since the tunnel 32 is inclined upwardly relative to the horizontal plane of cutting blade 112 and the ground, the cut grass particles, which are being forced against the top wall 38 of tunnel 32, will first be elevated as they travel through the first half or the ascending portion of the tunnel. This elevation imposes a certain amount of gravitational potential to the cut grass particles. These particles then will engage the downwardly inclined second half or descending portion of the tunnel as they continue their movement therethrough and will be driven downwardly relative to the ground. The angle of inclination of tunnel 32 is selected to be sufficiently large such that the cut grass particles are discharged from tunnel 32 with a sufficient downward component of motion to substantially hide these particles in the uncut grass. It has been found that an acceptable mulching action is achieved by a tunnel 32 having a diameter of 16" and which rises from 4-6" from front to back.

When operated as a mulcher, it has been found that rotary lawn mower 2 according to the present invention is particularly effective. The mulching action of mower 2, which is believed to result from the inclination of tunnel 32, allows grass to be cut in longer increments and still be effectively mulched. In addition, the mulching action is effective even when the grass is relatively wet and heavy. It has been found that the mulcher of this invention does a superior job of hiding cut grass particles in the uncut lawn when compared with many other conventional types of mulchers.

While the same lawn mower 2 preferably includes the slanted grass circulating tunnel 32 and the rear and side discharge ports 52 and 54 as shown in FIG. 1, the mulching feature of the present invention could be used separately if so desired. In this regard, the rear and side discharge ports would be absent so that tunnel 32 could be operated only as a mulcher. However, this would still yield a superior mulcher for the reasons noted above.

In addition to the basic operation of lawn mower 2, the particular type of grass receiving means 12 disclosed herein is also unique. In the grass receiving means 12, the open mouth defined by the entrance opening 144 to chute 140 and open area 145 in the top wall 141 of chute 140 has a total area which is substantially larger than the cross-sectional area of chute 140. In addition, chute 140 is pivotally mounted relative to bag 126 by pivot pin 136. Both of these features contribute to a grass receiving means 12 which is much more easily emptied than prior art bags.

When bag 126 becomes filled with grass clippings, it must be removed from housing 4 for emptying. The operator does this by grabbing handle 146 and pulling the chute 140 out of rear deck 21 in which it is received. Since chute 140 is pivotally mounted relative to bag 126, the operator can always keep the mouth of the chute 140 pointed upwardly during removal of the chute 140 to prevent any of the grass clippings from falling out of bag 20. Thus, there is no longer any need for a door on the front of the chute which allows the open mouth thereof to be unobstructed. To empty bag 126, the operator need only invert the bag 126 and allow the grass clippings to fall through the open mouth of chute 140. These clippings will be much more quickly and easily discharged therethrough, when compared to prior art bags, because of the greater area through which they pass, i.e. both opening 144 and area 145. In addition, no closure doors need be opened to empty bag 126 since no closure doors are used on the front of chute 140. Thus, grass receiving means 112 has many advantages over prior art bags.

In addition, the orientation of side wings 78 is advantageous since these side wings are sufficiently sized to form a blocking member adjacent each side of rear discharge port 52. Sometimes when the grass receiving means 12 is not being used, various objects, such as stones or sticks, can be thrown through rear discharge port 52. This can happen whenever door 58 is held open by the operator, for whatever reason, and motive means 10 is operating. However, side wings 78 will intercept or block these thrown objects and prevent them from being thrown to one side of the mower. Thus, side wings 78 increase the safety of lawn mower 2. Side wings 78 perform this function while also serving as part of the means for latching the handle 92 in place.

Rear Dispersal Attachment

Referring now to FIGS. 11-13, a dispersal attachment for dispersing cut grass particles over an area in back of housing 4 is generally illustrated as 180. Dispersal attachment 180 includes a front, hollow chute 182 which is shaped generally similarly, at least in an exterior cross-sectional configuration, to the chute 140 of grass receiving means 12. However, the top wall 183 of chute 182 is not cut-away in the manner of open area 145, but is solid. A raised lip 184 extends around the top wall 183 of chute 182 in a manner which defines a slightly indented recess 185 in top wall 183. Pivotal door 58 on housing 4 will be received in recess 185 to couple chute 182 in the seat defined by rear deck 21. The bottom wall 186 of chute 182 can be provided with recesses 187, identical to recesses 152, for being mated with the lugs 150 on support surface 26 of rear deck 21. Chute 182 of the dispersal attachment 180 is meant to allow the dispersal attachment to be releasably coupled to rear deck 21 in the same manner as the chute 140 of grass receiving means 12 is coupled thereto. The top wall 183 of dispersal attachment 180 includes a handle 188 for manipulating the attachment relative to the mower.

The front wall 189 of chute 182 is not completely open as in the chute 140 for grass receiving means 12. Instead, a rectangular opening 190 is located in the upstream side of front wall 189, i.e. the side of front wall 189 first encountered by cut grass particles circulating in the direction of the arrows B. In addition, dispersal attachment 180 includes a rear dispersing member 191 connected to chute 182. Dispersing member 191 includes side walls 192 and a top wall 193 which define a U-shaped open cavity 194 which faces downwardly. Dispersing member 191 further includes a downwardly extending rear wall 195 which is located in the path of directions of the cut grass particles through the dispersal attachment. See the arrows C. Rear wall 195 intercepts the cut grass particles and directs them downwardly onto the lawn.

As shown in FIG. 11, dispersal attachment 180 is preferably designed so that the cut grass particles are deposited in a windrow 196 along one side of the mower 2. This occurs because opening 190 is located generally in an upstream side of the front wall 189. Since the cut grass particles have a tangential direction of movement in tunnel 32, they exit through opening 190 and naturally keep moving in this direction as shown by the arrows C. Thus, the cut grass particles naturally tend to move from the front right corner to the left rear corner of dispersal attachment 180 for deposition in a windrow along the left side of mower 2. However, dispersing member 191 could be provided with any suitable baffle (not shown) for directing the cut grass particles in any desired dispersal pattern. In addition, rather than having the bottom of the dispersing member completely open, the bottom wall 186 of chute 182 could be extended thereover. In this alternative configuration, a hole would have to be provided in the left rear corner of bottom wall 186 for allowing the cut grass particles to be deposited therethrough.

Dispersal attachment 180 is advantageous in any area where it is desirable to deposit the cut grass clippings in windows and then to manually rake these windrows up. Since the clippings are deposited in windrows, in takes much less time to rake them up than to try to rake the entire surface of the lawn. Dispersal attachment 180 is meant to be used alternatively with the grass receiving means 12. In other words, either grass receiving means 12 can be used, rear dispersal attachment 180 can be used, or the rear discharge port 52 is closed in which case the side discharge port 54 is used.

Method of Making the Mower Housing

An improved method for manufacturing mower housing 4 has been utilized by Applicant. In this method, mower housing 4, including the side discharge port 54, is preferably molded from a set of molds in a generally conventional metal or plastic forming process. However, that portion of the mold or die used to form the side discharge port is removable from the rest of the mold. Thus, whenever it is desired to mold housing 4 not having a side discharge port 54, it is only required that the portion of the mold corresponding to that port be removed. Thus, the same basic mold can be used to make mower housing 4 without the side discharge port 54. This is advantageous in that it lends to manufacturing simplicity and reduces cost, thereby allowing lawn mowers 2 with different configurations to be inexpensively manufactured from a standard mold.

Alternative Embodiments

As noted throughout, this invention relates to a rotary lawm mower 2 having a number of novel features. These features include:
(1) a side discharge port 54 located downstream of a rear discharge port 52;
(2) a tilted grass circulating passageway which operates as an improved mulcher;
(3) an improved means 14 for releasably coupling a grass receiving means 12 to a mower housing and an improved structure for the grass receiving means 12;
(4) a grass receiving means 12 and a dispersal attachment 180 which can be releasably coupled alternatively to the same discharge port in the mower housing and a particular type of dispersal attachment 180; and
(5) an improved method of manufacturing the mower housings.

All of these features can be used in combination with one another, or individually if so desired, or in various permutations or combinations depending on which particular features lawn mower 2 desirably has. For example, improved grass receiving means 12 having a much larger mouth than prior art bags of the same size can be used with lawn mowers 2 whether or not that same mower also incorporates the particular configuration of discharge ports 52 and 54. These and other modifications of the invention will be apparent to those skilled in the art. Thus, the scope of this invention is to be limited only by the appended claims.

I claim:
1. A rotary lawn mower for cutting grass or the like, which comprises:
   (a) a housing;
   (b) means for movably supporting the housing above the ground to allow the housing to be moved over a predetermined area of grass which is to be cut;
   (c) means carried on the housing for cutting grass at a predetermined height above the ground and for propelling particles of cut grass in a preferred path of travel relative to the housing;
   (d) a discharge port located in the housing in the preferred path of travel of the cut grass particles for discharging the particles outside the housing;
   (e) means associated with the discharge port for receiving and retaining the cut grass particles discharged therethrough, the receiving means including a relatively rigid chute having one or more circumferential walls which terminate in an entrance opening that is suited to be placed in a face-to-face relationship with the discharge port, and wherein at least one of the walls of the chute includes a cutaway portion which extends from the entrance opening over a predetermined area of the wall;
   (f) means for releasably coupling the chute to the discharge port of the housing so that the receiving means may be removed from the housing for emptying when filled with particles of cut grass, whereby the particles of cut grass can be emptied through an area defined by both the entrance opening of the chute and the cutaway portion in the wall of the chute; wherein the means for releasably coupling the receving means to the discharge port comprises:
   (i) an upwardly opening seat located on the housing adjacent the discharge port which seat is shaped to receive therein the chute of the receiving means;
   (ii) a pivotal member located on the housing adjacent the discharge port, wherein the pivotal member engages the chute and is configured to fit into the cutaway portion in the wall of the chute when the chute is received in the seat to block the cutaway portion and prevent cut grass particles from escaping therethrough; and
   (iii) means for biasing the pivotal member towards the seat to lock the chute against the seat and prevent unintentional removal therefrom.

2. A rotary lawn mower as recited in claim 1, wherein the pivotal member is also configured to cover the discharge port in the housing for blocking the discharge port whenever the receiving means is not coupled thereto.

3. A rotary lawn mower as recited in claim 1, further including detent means formed between the seat and the chute for further locking the chute in place against the seat.

4. A rotary lawn mower as recited in claim 3, wherein the detent means comprises:
   (a) a lug formed on the seat and extending upwardly therefrom; and
   (b) a recess formed in one of the walls of the chute in a position to mate with the lug on the seat whenever the chute is placed therein, whereby the interengagement of the lug and the recess in conjunction with the biasing force of the pivotal member locks the chute in place on the housing.

5. A rotary lawn mower as recited in claim 1, wherein the chute has a substantially rectangular cross-sectional configuration which includes top and bottom walls connected together by side walls, and wherein the cutaway portion is located in the top wall of the chute.

6. A rotary lawn mower as recited in claim 5, in which the cutaway portion in the top wall of the chute includes an inwardly projecting lip, and wherein the means on the housing for closing that portion comprises a pivotal flap which is shaped to close the opening and bear against the lip of the cutaway portion to force the chute against the housing.

7. A rotary lawn mower for cutting grass or the like, which comprises:
   (a) a housing;
   (b) means for movably supporting the housing above the ground to allow the housing to be moved over a predetermined area of grass which is to be cut;
   (c) means carried on the housing for cutting grass at a predetermined height above the ground and for propelling particles of cut grass in a preferred path of travel relative to the housing;
   (d) a discharge port located in the housing in the preferred path of travel of the cut grass particles for discharging the particles outside the housing;
   (e) means associated with the discharge port for receiving and retaining the cut grass particles discharged therethrough, the receiving means comprising:
   (i) a flexible bag having open and closed ends;
   (ii) a hollow, relatively rigid chute pivotably secured to the open end of the bag for pivotal movement relative to the bag, wherein the chute has a cross-sectional configuration of a predetermined area, and wherein the front of the chute defines an open mouth having an area which is larger than the area of the cross-sectional configuration of the chute, and wherein the open mouth is substantially unobstructed when the receiving means is not attached to the housing to allow the cut grass particles therein to be emptied through an area which is larger than the cross-sectional area of the chute with the pivotal attachment of the chute relative to the container allowing the chute to be manipulated to keep the open mouth pointed upwardly to prevent cut grass particles from falling out except when desired;

(f) outwardly extending handle means carried on the housing for guiding the housing during movement over the ground, wherein the handle means includes two spaced and upwardly extending rods; and (g) means for releasably coupling the receiving means to the housing with the open mouth of the chute being located adjacent the discharge port; wherein the coupling means for the receiving means comprises:

(i) an upwardly opening seat on the housing adjacent the discharge port for telescopically receiving the chute; and (ii) a bag support hanger secured to the closed end of the bag, wherein the bag support hanger includes a downwardly facing U-shaped loop at one end and an L-shaped support flange at the other end, wherein the loop and the support flange are respectively received on the rods of the handle means for supporting the bag therebetween.

8. A rear bagging lawn mower, which comprises:
(a) a housing having a rear discharge port through which particles of cut grass may be discharged;
(b) means for movably supporting the housing;
(c) means for cutting grass at a predetermined height above the ground and for throwing the particles of grass through the rear discharge port;
(d) a bag positioned adjacent the rear discharge port for receiving the cut grass particles thrown therethrough, wherein the bag includes a substantially rigid and rectangular chute having top, bottom and side walls which terminate in an entrance opening to the bag that may be aligned with the rear discharge port, and wherein at least a portion of the top wall of the chute is cut away to form an additional open area which, in conjunction with the entrance opening, defines an area through which the cut grass particles contained in the bag may be emptied when the bag is inverted;
(e) wherein the housing includes a U-shaped seat in which the chute of the bag is telescopically received with the entrance opening adjacent the rear discharge port, and further including a pivotable door normally arranged to close the rear discharge port, wherein the door is configured to fit into and bear against the cutaway portion of the top wall of the chute to selectively block the additional open area therein whenever the chute is received in the seat, and
(f) means for biasing the door toward the seat for releasably retaining the chute of the bag in the seat.

9. A rotary lawn mower for cutting grass or the like, which comprises:
(a) a housing having a discharge port through which particles of cut grass may be discharged;
(b) means for movably supporting the housing;
(c) means for cutting grass at a predetermined height above the ground and for throwing the particles of grass through the discharge port;
(d) means releasably associated with the discharge port for receiving and retaining the cut grass particles discharged therethrough;
(e) wherein the housing includes a substantially U-shaped and upwardly facing seat adjacent the discharge port in which seat the receiving means is releasably received, the seat having upwardly extending side wings which extend along and outwardly from each side of the discharge port, wherein the side wings are sufficiently sized to intercept objects which may be accidentally thrown through the discharge port when the receiving means is not associated therewith; and
(f) pivotal door means on the housing for closing the discharge port when the receiving means is not associated therewith, wherein the door means is biased into a normally closed position.

10. A rotary lawn mower as recited in claim 9, further including an outwardly extending handle means carried on the housing for guiding the housing during movement over the ground, wherein the handle means includes two, spaced and upwardly extending rods, and wherein the side wings further include means for latching the rods of the handle means in one of a plurality of adjusted positions.

* * * * *